UNITED STATES PATENT OFFICE.

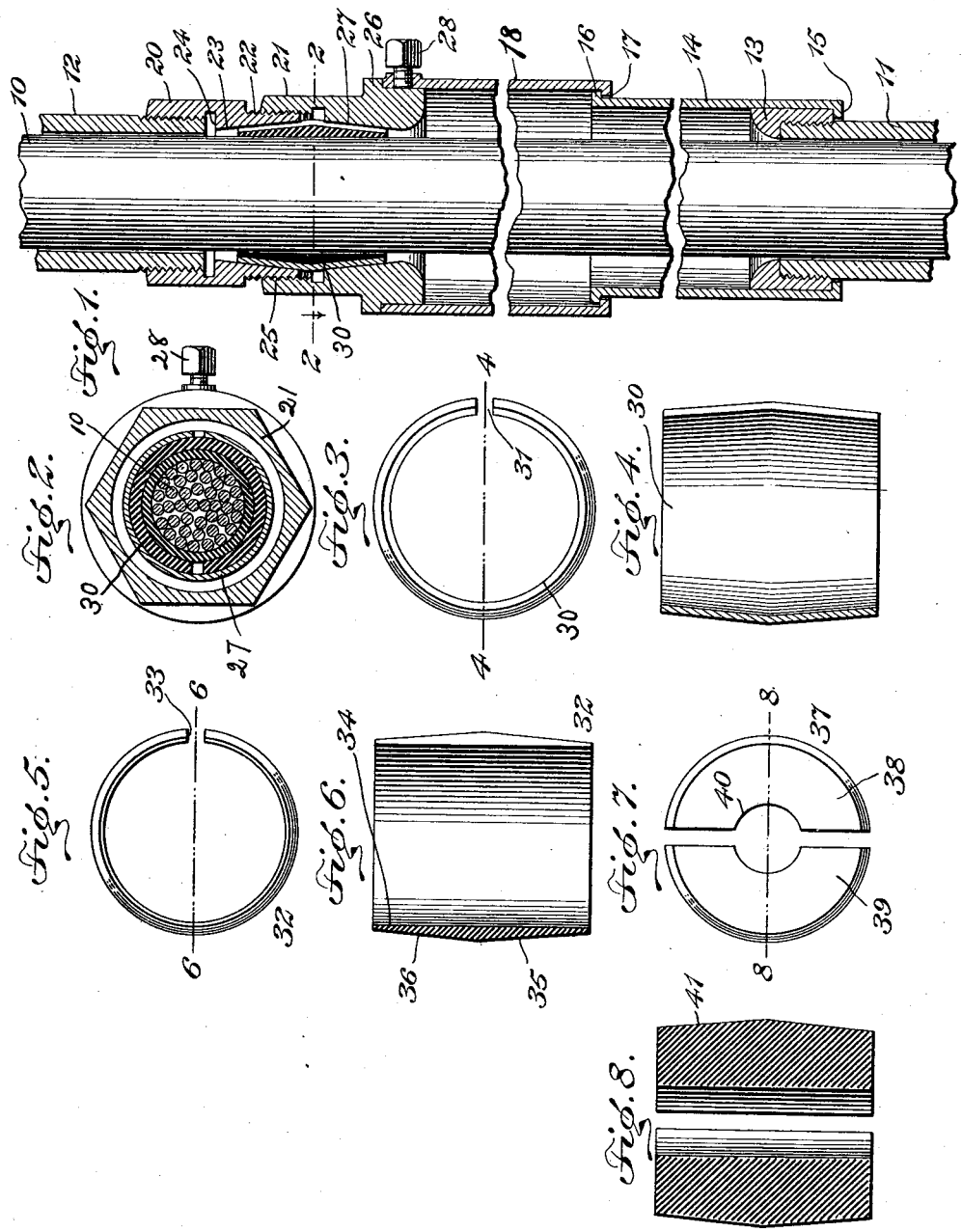

COLMAN J. MULLIN, OF NEW YORK, N. Y.

FEEDER-SUPPORT.

1,063,827. Specification of Letters Patent. Patented June 3, 1913.

Application filed March 31, 1906. Serial No. 309,140.

*To all whom it may concern:*

Be it known that I, COLMAN J. MULLIN, a citizen of the United States, residing at New York, borough of Brooklyn, in the county of Kings and State of New York, have invented a certain new and useful Feeder-Support, of which the following is a specification.

This invention relates to means for supporting an electrical conductor, usually a heavy cumbersome cable of large current carrying capacity and termed a "feeder," in buildings and other structures.

The object is to provide a supporting device operating to engage with the feeder frictionally and to so firmly grip said feeder as to hold it securely in place, thus overcoming the tendency of the feeder to slip, by reason of its weight, through the supporting means. Furthermore, the feeder is insulated from electrical contact with the supporting means at the place or places where the support or supports are gripped on the feeder. Again, the construction of the feeder support is simple and strong, and the parts of said support may be assembled quickly. The construction is such that the sections or lengths of the feeder-inclosing conduit are coupled by my new feeder-support, and the operations of securing the feeder in place and of installing both the conduit and the feeder are facilitated by the use of the new device.

Broadly stated, the invention consists of a feeder support adapted to be compressed around a cable or feeder for engagement frictionally therewith.

The invention further consists of an adjustable feeder support, and an electrical insulating bushing which is adapted to be closed or compressed by said support into frictional engagement with a conductor or feeder.

Furthermore, the invention consists of a junction box between sections or lengths of a conduit, and a separable feeder support coöperating with the said box and one section or length of the conduit.

As a preferred construction of the support, I employ coöperating members adjustable relatively one to the other, one or both of said members having inclined surfaces internally thereof, and a compressible member within the aforesaid support and adapted to be forced by the inclined surface or surfaces thereof into engagement with the conductor. The compressible member may be in the form of a split metallic thimble, or it may be a split or divided bushing of insulating material, or I may, and preferably do, use both the metallic thimble and the insulating bushing.

In the drawings: Figure 1 is a vertical sectional elevation through a feeder support and panel or pull box constructed in accordance with this invention, a conductor or feeder being shown in elevation; Fig. 2 is a cross-section on the line 2—2 of Fig. 1; Fig. 3 is a detail view in end elevation of the divided metallic thimble employed in the feeder support; Fig. 4 is an axial section through the same on the dotted line 4—4 of Fig. 3; Fig. 5 is an end view of a compressible insulating bushing; Fig. 6 is an axial section on the line 6—6 of Fig. 5; Fig. 7 is a detail end view of another form of the divided insulating bushing adapted to be used interchangeably with the construction of Figs. 5 and 6; Fig. 8 is an axial section on the line 8—8 of Fig. 7.

An electrical conductor or feeder 10, of any suitable construction and dimensions, is adapted to extend through a conduit, two lengths or sections of which are indicated at 11, 12, in Fig. 1 of the drawings. The length 11 of the conduit is screwed into a gland 13, the latter being inclosed within one section 14 of a panel or pull box. Said section 14 is provided at its bottom with an inwardly extending flange 15, on which flange rests the gland 13, for the purpose of connecting said parts 13, 14. The section 14 is provided at its upper end with an external flange 16, the latter engaging with a foot flange 17 on another member 18 of the panel or pull box. In assembling the parts of the panel or pull box, the gland 13 is slipped into the member 14 through the upper open end thereof, and said member 14 is slipped into the member 18 through its upper open end, thus operatively connecting the parts of the panel or pull box, and enabling the length or section 11 of the conduit to be screwed into the gland 13.

The feeder support consists of the members 20, 21, and means within said members for frictionally engaging with or gripping the conductor or feeder 10. The member 20 of the feeder support is provided at its upper portion with an internal thread into which is adapted to be screwed the length or section 12 of the conduit. The lower part of the member 20 is reduced and provided with an external or male thread 22. Said lower part of the member 20 is also provided with an inclined surface 23 internally thereof, said inclined surface extending from the lower extremity of the member 20 to an internal shoulder 24. The other member 21 of the feeder support has an internal or female thread 25, into which is screwed the male threaded portion 22 of the member 20. Said member 21 is thickened at its lower portion to form an external ledge or shoulder 26, below which ledge or shoulder said member 21 is reduced in diameter so as to fit into the upper open end of the section 18 of the panel or pull box, whereby the member 21 is received into the panel or pull box section 18, for the shoulder 26 to rest upon said section 18, as shown by Fig. 1. Furthermore, the member 21 of the feeder support has an inclined surface 27 internally thereof, said surface 27 being inclined oppositely to the corresponding surface 23 of the member 20. The member 21 of the feeder support is not only adapted to rest upon and be supported by the section 18 of the panel or pull box, but said member 21 is held fixedly in place by a suitable form of clamp, such as the binding screw 28, which is mounted in the section 18, and is adapted for frictional engagement with the member 21. With the member 21 held firmly in position, the member 20 is adapted for rotative adjustment into the threaded part 25 of the member 21, whereby the member 20 may be turned so as to make the inclined surface 23 thereof approach toward or recede from the surface 27 of the member 21.

By reference to Fig. 1, it will be seen that the conductor or feeder 10 extends through the lengths 11, 12, of the conduit, the members 14, 18, at the panel or pull box, and the members 20, 21, of the feeder support.

30 designates a metallic thimble which is fitted around the feeder or conductor 10, and is inclosed within the members 20, 21, of the support in such manner as to have engagement with the inclined surfaces 23, 27, of said members. Said thimble is shown in detail by Figs. 3 and 4 of the drawings, from which it appears that the thimble is split or divided by providing a longitudinal opening 31 in one side thereof, whereby the thimble is adapted to be compressed or reduced in diameter by the rotative adjustment of the member 20 relative to the member 21 of the feeder support. Said thimble is made tapering from its middle portion toward the respective end portions thereof, as shown more clearly by Fig. 4, and thus the thimble, both internally and externally, has oppositely inclined surfaces. The thimble is fitted within the members 20, 21, for its respective inclined portions to have engagement with the surfaces 23, 27, of the respective members 20, 21, and it is evident that by rotating the member 20, so as to screw it into the member 21, the surface 23 of said member 20, and the surface 27 of member 21, will operate on the double tapered thimble 30, to compress the thimble or reduce the diameter thereof.

Another element which I prefer to employ in the feeder support is an insulating bushing, two forms of which are represented by Figs. 5, 6, and 7, 8, respectively. In the construction of the bushing 32, shown by Figs. 5 and 6, it is made of one piece of suitable insulating material, the bushing being divided longitudinally by a slot or opening 33 in one side thereof. The inner surface of the divided insulating bushing is cylindrical, as at 34, but the external surface of said bushing is provided with inclined portions 35, 36, corresponding to the oppositely inclined surfaces of the divided metallic thimble 30. The bushing 32 is fitted snugly within the metallic thimble 30, for the surfaces 35, 36, to have engagement with the inclined surfaces of the thimble as shown by Fig. 1, but the cylindrical inner surface 34 of the bushing engages with the surface of the conductor or feeder 10.

The bushing shown by Figs. 5 and 6, is adapted for use on cables of large diameter, for the purpose of frictionally gripping said cable, and supporting it in place against sagging under the weight thereof, substantially as shown by Fig. 1. My feeder support, however, may be used for supporting cables of smaller diameter by the employment of bushings which may be used in lieu of the bushing 32. One form of this reducing bushing is represented by Figs. 7 and 8, wherein the bushing 37 has sections 38, 39, the walls of which are much thicker than the wall of the split bushing 32. The sections 38, 39, are provided on their opposing faces with recesses 40, adapted to coincide or register, and produce an opening for the accommodation of a feeder or conductor similar to the conductor 10, but of smaller diameter than the same. The sections forming the bushing 37 have inclined surfaces 41 adapted for engagement with the coresponding surfaces of the metallic thimble 30, but the walls of the recesses 40 are semi-cylindrical, so that a passage of uniform diameter is provided in the bushing 37, whereby said bushing has a gripping surface adapted to engage with the feeder or conductor in a manner to securely hold the same in place when the bushing is compressed upon said conductor by the action of the thimble 30, and the two part support 20, 21.

Although I have shown and described my new feeder support as having a metallic thimble 30, and a divided bushing, it will be understood that I do not desire to strictly confine myself to the use of both the thimble and the bushing, nor do I desire to strictly confine myself to a bushing made of insulating material.

The operation of the invention is readily understood. The parts of the panel or pull box are quickly assembled, and the section 11 of the conduit is attached to the panel or pull box by screwing it into the gland 13. The feeder is run through the conduit 11, 12, the panel or pull box and the support, one member 21 of the feeder support being held on the section 18 of the panel or pull box by the clamp 28. The thimble 30 and the insulating bushing are placed within the member 21, the bushing engaging with the feeder or conductor, and the member 20 is screwed into the member 21, whereby the two members coöperate in compressing the thimble 30, and the bushing 32 or 36, so as to make said bushing engage frictionally with the conductor for supporting it securely within the new support.

It will be understood that the feeder is not only supported mechanically by the new device, but said feeder is insulated electrically from the support at the place where the bushing is gripped thereon.

As shown by Fig. 2, the members 20, 21, of the support may have hexagonal or polygonal surfaces for the application of a wrench or other tool in turning one or both parts.

Although I have shown the new device as especially adapted for supporting a single feeder in an upright position, I would have it understood that my invention may be used in a variety of ways. The support may receive two or more conductors, and frictionally grip the same. It may be used in a horizontal or in an inclined position. Furthermore it may be used as a support for other devices, such as pipes.

Changes in the form, size, proportion, and minor details in construction may be made without departing from the spirit of the invention or sacrificing any of the advantages thereof, and I, therefore, reserve the right to make such alterations and modifications as fairly fall within the scope of my invention.

Having thus described my invention, what I claim as new, and desire to secure by Letters Patent is:—

1. In a device of the class described, the combination with a sectional conduit, a pull box, and a conductor extending therethrough, of a gripping device incasing a part of the conductor and engaging frictionally therewith, said gripping device being positioned between a section of the conduit and the pull box and operating to connect the same together.

2. In a device of the class described, the combination with a sectional conduit, a pull box, and a conductor extending therethrough, of a gripping device positioned between the adjacent ends of the pull box and one section of the conduit, said gripping device incasing the conductor for a part of its length and engaged directly therewith for supporting the weight of said conductor within the conduit.

3. The combination of a conduit, a conductor grip supported by the side walls of said conduit, a conductor incased within the conduit and frictionally engaged with said gripping device whereby the weight of the conductor is imposed upon the side walls of said conduit.

4. In a device of the class described, the combination with members composing a conduit, a conductor incased therein, and a pull box, of gripping mechanism positioned between adjacent ends of one conduit member and the pull box and operatively connecting the same together, said gripping mechanism embodying coöperating members rotative with respect to each other and a compressible member which incases the conductor and is retained in frictional contact therewith by said coöperating members.

5. In a device of the class described, the combination with members composing a conduit, a conductor incased therein, and a pull box, of gripping mechanism positioned between adjacent ends of one conduit member and the pull box and operatively connecting the same together, said gripping mechanism embodying screw threaded members coupled to each other for relative rotative movement and a compressible member positioned within the screw threaded members and incasing a part of the conductor, said compressible member being held in frictional engagement with the conductor by the operation of said screw threaded members.

6. In a device of the class described, the combination with members composing a conduit, a conductor incased therein, and a pull box, of coacting grip-operating members positioned between the adjacent ends of one conduit member and the pull box and operatively connected therewith, said grip-operating members being coupled together for relative rotative movement, and divided gripping means incasing the conductor for a part of its length and engaging frictionally therewith by the operation of said grip-operating members.

7. The combination of a substantially vertical conduit, a substantially vertical conductor incased therein, and a gripping device attached to the conduit for imposing the weight of said conductor upon the conduit, said gripping device embodying coöperating members having frictional engagement with said conductor.

8. In a device of the class described, a sectional conduit, a conductor incased therein, a divided thimble incasing said conductor for a part of its length, said thimble being composed of electrical insulating material, and coöperating members positioned between and connected with adjacent end portions of sections of the conduit, said coöperating members engaging with said divided thimble for compressing the latter into direct frictional engagement with the conductor.

9. The combination of a vertical conduit, a conductor incased within said conduit and extending vertically therethrough, and a gripping device supported upon the conduit for imposing the weight of said conductor thereon, said gripping device embodying coöperating metallic members and means for electrically insulating said metallic members from said conductor.

10. In a device of the class described, a conduit, a feeder or conductor extending lengthwise through the same, members coupled to each other and to the conduit, and a divided bushing adapted to be compressed upon the incased cable or feeder by adjustment of said members.

11. In a device of the class described, a sectional conduit, members coupling sections of said conduit, a conductor positioned within said conduit, a divided thimble within said members, and a divided bushing within the thimble, and means for compressing the bushing upon the conductor.

12. In a device of the class described, a conduit, an electrical conductor incased therein, coöperating members coupled together for rotative adjustment, and gripping means adapted by the rotative adjustment of the members to be gripped frictionally on said conductor incased within said conduit.

13. In a device of the class described, a conduit, an electrical conductor incased therein, coöperating members coupled for rotative adjustment, one of said members having an inclined surface, and gripping means adapted to be compressed by said inclined surface upon said conductor.

14. In a device of the class described, a sectional conduit for an electrical conductor, members connecting sections of said conduit and screwed together, said members having surfaces inclined to each other, and conductor gripping means adapted to be compressed by said surfaces of the members.

15. In a device of the class described, a conduit, a conductor incased therein, means for supporting the electrical conductor within said conduit comprising members coupled for rotative adjustment, said members being provided with coöperating inclined surfaces internally thereof, and conductor gripping means separate from said member and coöperating with surfaces of said members and adapted to be compressed thereby.

16. In a device of the class described, a conduit, means for supporting an electrical conductor within said conduit comprising members provided with inclined surfaces internally thereof, and gripping means also having inclined surfaces coöperating with the surfaces of said members and adapted to be compressed into frictional engagement with an inclosed conductor, whereby the weight of the conductor is transferred to the conduit.

17. In a device of the class described, means for supporting an electrical conductor within a conduit comprising members coupled for rotative adjustment, each member being provided with an inclined surface, a metallic thimble with inclined surfaces, said thimble being within the members, and a compressible gripping medium within the thimble.

18. In a device of the class described, means for supporting an electrical conductor comprising members coupled for rotative adjustment, each member being provided with an inclined surface, a metallic thimble with inclined surfaces, said thimble being positioned within the members, and a divided bushing, the latter having an external inclined surface and an internal cylindrical surface.

19. In a device of the class described, a pull box, a conduit adapted to carry the aforesaid box, and a feeder support positioned between the adjacent end portions of the pull box and a section of the conduit.

20. In a device of the class described, a pull box, a conduit on which the aforesaid box is mounted, and a feeder support positioned between the adjacent end portions of the pull box and a section of the conduit, said feeder-support having a member supported by and clamped to the aforesaid box.

21. In a device of the class described, a pull box, a conduit adapted to carry the aforesaid box, and a feeder support intermediate of the aforesaid box and a section of the conduit, said feeder-support comprising coöperating members coupled for rotative adjustment, one of said members being held on the aforesaid box.

22. In a device of the class described, a pull box, a conduit on which the aforesaid box is mounted, and a two-part feeder support having its members coupled for rotative adjustment, one of said members being connected with the aforesaid box.

23. In a device of the class described, a pull box, a conduit on which the aforesaid box is mounted, and a two-part feeder support having its members coupled for rotative adjustment, and means for clamping one member of the feeder support to said box.

24. A grip for vertical cable conduits comprising a gripping member and a socket therefor, coöperating to secure said cable relatively to said conduit in the manner and for the purpose substantially as set forth.

25. An attachment of the class described for securing electrical conductors to their conduit, comprising a socket, a gripping member, and means operable respectively to actuate said gripping member within said socket, and to secure said socket to said conduit, to maintain said conductor in adjusted position within said conduit.

26. A grip for vertical cable conduits comprising a compressible gripping member, a socket therefor, and a compressing member coöperating to secure a cable relatively to a conduit in the manner and for the purpose substantially as set forth.

27. A grip socket for a vertical cable conduit, comprising a connecting member, and an adjustable grip member coöperating therewith to transfer the weight of the conductor to the conduit, substantially as described.

28. A gripping device for electrical conductors in vertical conduits of the class having a plurality of tubular sections, said device comprising a coupling means to receive and join the ends of adjacent tubular sections, and gripping means to engage and support a depending portion of said conductor, substantially as described.

29. An attachment of the class described for securing vertical armored electrical conductors in position within a conduit, comprising a socket; a gripping member; and means operable respectively to actuate said gripping member within said socket, and to secure said socket to said conduit.

30. The combination of a vertical conduit, a conductor grip attached to said conduit, and a conductor incased within said conduit and engaged by said conductor-grip, a substantial part of the weight of said conductor being suspended below the conductor-grip, the latter operating to impose the weight of said conductor upon the side walls of the conduit.

31. The combination of a vertical conduit, a conductor incased therein, and a gripping device coöperating with the conduit and the conductor for imposing the weight of said conductor upon the conduit.

32. The combination with a vertical conduit, and a conductor incased therein, of a gripping device supported on the conduit and engaging frictionally with the conductor, said gripping device operating to impose the weight of the conductor upon the conduit.

33. A wire circuit protecting and supporting device comprising an annular threaded body having a tapering internal wall, a plurality of rigid tapering wedges separate from said body conforming to said wall and adapted to clamp a conductor within the body, and a threaded clamping ring engaging said wedges and the threaded body.

34. In a device of the class described, a conduit, an electrical conductor incased therein, coöperating members carried by the conduit and coupled together for rotative adjustment, and gripping means slidably engaged with the casing and adapted by the rotative adjustment of the members to be gripped frictionally on said conductor incased within said conduit.

In testimony whereof I have signed my name to this specification in the presence of two subscribing witnesses.

COLMAN J. MULLIN.

Witnesses:
H. I. BERNHARD,
R. A. MOONEY.

Copies of this patent may be obtained for five cents each, by addressing the "Commissioner of Patents. Washington, D. C."